United States Patent [19]
Malinchak

[11] 3,922,766
[45] Dec. 2, 1975

[54] INSERTS FOR METAL CUTTERS

[76] Inventor: Paul Malinchak, 5247 W. 51st St., Fairview, Pa. 16415

[22] Filed: Aug. 12, 1974

[21] Appl. No.: 496,703

Related U.S. Application Data

[62] Division of Ser. No. 280,777, Aug. 15, 1972, abandoned.

[52] U.S. Cl. .............................. 29/105 R; 29/95 R
[51] Int. Cl.² ...................... B26D 1/00; B26D 1/12
[58] Field of Search .......... 29/95, 96, 105 R, 105 A; 82/36

[56] References Cited
UNITED STATES PATENTS

| | | | |
|---|---|---|---|
| 2,630,732 | 3/1963 | Piazze | 82/36 R |
| 3,568,284 | 3/1971 | Lunden et al. | 29/105 R |
| 3,574,911 | 4/1971 | Penoyar | 29/105 A |
| 3,636,602 | 1/1972 | Owen | 29/95 |
| 3,733,665 | 5/1973 | Spriggs | 29/105 A |

FOREIGN PATENTS OR APPLICATIONS

| | | | |
|---|---|---|---|
| 1,442,774 | 5/1966 | France | 29/96 |

*Primary Examiner*—Harrison L. Hinson
*Attorney, Agent, or Firm*—Farley, Forster and Farley

[57] ABSTRACT

A cutting tool made up of a plurality of inserts. Each insert is in the form of a circular disk or cylinder having a plurality of cutting teeth disposed symmetrically around the outer periphery. The cutting members are adjusted in the holder so that each tooth progressively cuts behind the tooth ahead of it so that the peaks of one edge cover a part of the trough of another edge whereby said cutters progressively cut an article. The cutters can be adjusted so that as certain teeth wear, the cutters can be rotated to bring additional new teeth into cutting position.

19 Claims, 5 Drawing Figures

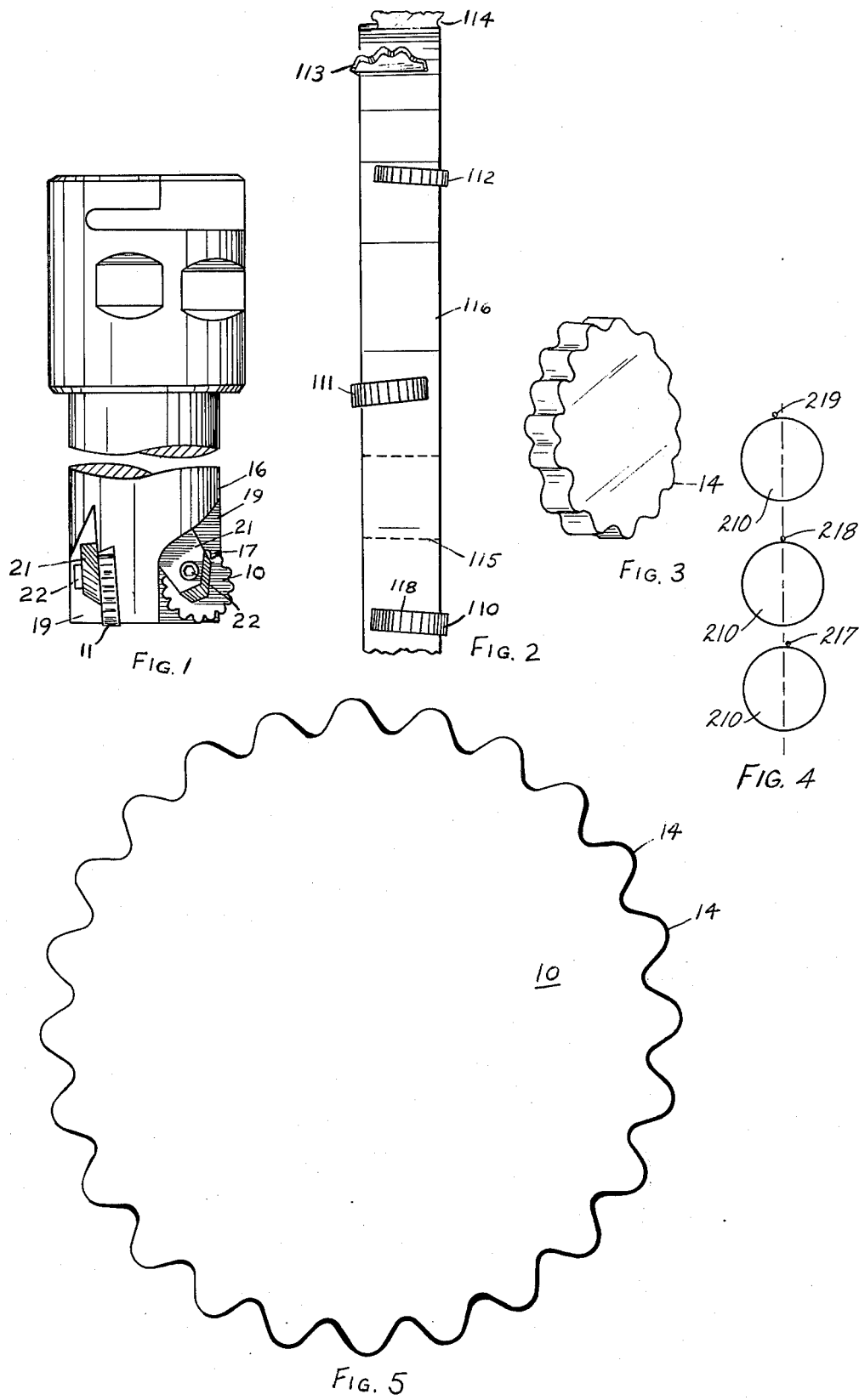

INSERTS FOR METAL CUTTERS

This application is a division of Ser. No. 280,777, filed Aug. 15, 1972, now abandoned.

REFERENCE TO PRIOR ART

U.S. Pat. No. 3,574,911 shows a triangular type cutter which is made according to the prior art and on which this invention constitutes an improvement.

OBJECTS OF THE INVENTION

It is an object of the invention to provide an improved cutter.

Another object of the invention is to provide a cutter that is simple in construction, economical to manufacture, and simple and efficient to use.

Another object of the invention is to provide a cutter that has symmetrically arranged teeth around the outside in a generally circular configuration, the teeth being generally sinusoidal in shape.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

FIG. 1 is a view showing the cutters according to the invention, supported in an end mill embodying the present invention.

FIG. 2 is a partial edge view of a saw utilizing the teeth according to the invention.

FIG. 3 is an isometric view of an insert.

FIG. 4 is a schematic view showing the inserts offset from each other so that the teeth will progressively cut.

FIG. 5 is a side view of a cutter according to the invention.

DETAILED DESCRIPTION OF THE DRAWINGS

Now with more particular reference to the drawings, the present invention is directed to a tungsten carbide type insert which may be used in end mills, milling cutters, saws, or any other suitable type of metal cutting tool. The tools could be made of carbon steel.

The tool according to the present invention has virtually infinite indexing capability, can be phased a virtually infinite number of times, it can also have a virtually infinite number of indexes; that is, it can be indexed a virtually infinite number of times. If 36° of the periphery of the insert were used for one phase, the insert can be indexed ten times. This cannot be done with square or triangular inserts. Another advantage of the round insert disclosed herein is its additional structural strength over a square or triangular insert. The round insert requires no selection of any particular part of it be used since the insert is symmetrical around its entire periphery. It is also obvious that the round insert provides a chip thinning. This is an advantage over the square inserts that are shown in prior art U.S. Pat. No. 3,574,911, for example.

According to the present form of the invention shown, for example, in FIGS. 3 and 5, a cylindrical insert 10 is shown having sinusoidally disposed teeth 14 around the outer periphery. This insert may be made of tungsten carbide, high speed steel, high carbon steel or other suitable cutting materials for use in metal cutting. The cutter according to the present invention may be supported in a holder so that the serrated cutting edges of the projecting teeth have similar serrations but each tool around the circumference has its serrations displaced from each other or out of phase with the next succeeding tooth so that the serrations of one tooth cover the notches of the other teeth. The serrated cutting edges are preferably of sinusoidal shape. The disclosed inserts are round in shape. Thus the tool, according to the present invention, is capable of removing metal at a high rate while making deep cuts into a work piece. This is especially important in connection with metal sawing as well as metal milling operations.

The end mill shown in FIG. 1 has the insert 10 supported around its periphery. It has a cylindrical body 16 which is notched at its outer end as at 19 for receiving the inserts 10 in operative cutting position. A plurality of clamps 21 are supported around the outer periphery of the cutter and secured in place by screws 22 for holding the inserts in place. In order to hold the one insert 10 in its sequence position relative to insert 11, and to other inserts that may be supported around the axis of the holder 16, locaters 17 may be inserted in the body 16 between the convolutions of the insert 10. These locaters may be offset from each other so that the inserts are rotated from each other in the manner the inserts 210 are rotated from each other in FIG. 4. In FIG. 4, the inserts 210 are shown with locaters 217, 218 and 219 rotated to the right of the center line in the case of 217, on the center line in 218, and to the left of the center line in 219. The locaters 17 in FIG. 1 may thus be moved relative to each other so that locaters 17 rotate the inserts 10 relative to each other in sequence position.

In the embodiment of the invention shown in FIG. 2, the inserts 110, 111, 112, 113, and 114 are shown around the outer periphery of a saw 116 which is a cylindrical body having a central hole 115 through which a suitable arbor may be passed. The inserts will have sinusoidally disposed teeth 118 on the outer periphery thereof and the inserts will be sequenced so that the teeth are displaced around the central axis of the cutters so that each tooth cuts a part of the material left by the tooth just ahead of it.

By properly locating the locaters 17 and 217, the inserts may be indexed to suitable cutting position so that each tooth cuts the desired amount by providing a greater number of cutters around the outer periphery of, for example, a saw as shown in FIG. 2, each revolution of the saw 116 can cut a maximum amount of material from the part being machined.

The foregoing specification sets forth the invention in its preferred practical forms but the structure shown is capable of modification within a range of equivalents without departing from the invention which is to be understood is broadly novel as is commensurate with the appended claims.

The embodiment of the invention in which an exclusive property or privilege is claimed are defined as follows:

1. A rotary cutting tool comprising;
 an annular body having a plurality of insert pockets spaced around the periphery of said body,
 a plurality of identical inserts indexable about an axis extending transversely of the axis of said body located in said pockets,
each of said inserts having a plurality of identical evenly spaced peripheral cutting teeth,
locating means differently positioned in successive pockets in said body adapted to engage and locate any one of the teeth of respective inserts in successive phased relation to provide a progressive fractional distribution of cutting action,
and the cutting teeth of each insert being indexable in any one of said pockets to present alternate identical cutting teeth in identical cutting position of any one of said pockets.

2. A cutting tool as set forth in claim 1 wherein said insert teeth project to a common circular cylindrical form.

3. A cutting tool as set forth in claim 2 wherein said cutting teeth are uniformly spaced.

4. A cutting tool as set forth in claim 3 wherein said cutting teeth are symmetrical in form.

5. A cutting tool as set forth in claim 4 wherein said cutting teeth are sinusoidal in form.

6. A cutting tool as set forth in claim 5 wherein each insert has parallel faces with the cutting teeth extending with uniform cross section therebetween in normal relation thereto.

7. A cutting tool as set forth in claim 1 wherein said locating means comprise tooth engaging locator projections in said pockets.

8. A cutting tool as set forth in claim 1 wherein said locating means comprise tooth engaging locator projections in said pockets, said pin projections having progressive phase positions related to the number of pockets.

9. A cutting tool as set forth in claim 1 wherein said locating means comprise tooth engaging locator projections in said pockets, said pin projections having a number of different progressive phase positions equal to the number of pockets.

10. A cutting tool as set forth in claim 7 wherein said pockets have circular arc sidewalls for locating the cylindrical outer periphery of the inserts which together with said locating means provide a number of index positions for a single face of each insert equal to the number of insert teeth.

11. A cutting tool as set forth in claim 10 providing a number of insert index positions in each pocket equal to two times the number of insert teeth.

12. A cutting tool as set forth in claim 11 wherein each cutting insert has a number of different index positions in the cutter equal to twice the number of teeth times the number of phase positions.

13. An indexable insert in a cutting tool as set forth in claim 12 comprising an integral cylindrical form with symmetrical sinusoidal uniformly spaced cutting teeth extending in normal uniform cross section relation between parallel faces.

14. A cutting tool as set forth in claim 12 adapted to provide each insert with a number of different index positions in a minimum order of magnitude of approximately 100.

15. An indexable insert as set forth in claim 13 having a number of teeth in the order of magnitude of 24.

16. A rotary cutting tool comprising;
an annular body having a plurality of insert pockets spaced around the periphery of said body,
a plurality of identical inserts located in said pockets,
each of said inserts having a plurality of peripheral cutting teeth which project to a common circular cylindrical form,
and the cutting teeth of each insert being indexable in any one of said pockets to present alternate identical cutting teeth in cutting position.

17. A rotary cutting tool as set forth in claim 16 including clamping means attached to said body and positioned at each said pocket in said body to hold each said insert in rigid relation to said body whereby said teeth of respective inserts may be held in phased relation to provide a progressive fractional distribution of cutting action.

18. An indexable insert adapted for use in a cutting tool as set forth in claim 16 comprising an integral cylindrical form with symmetrical sinusoidal uniformly spaced cutting teeth extending in normal uniform cross section relation between parallel faces.

19. An indexable insert as set forth in claim 15 having a number of teeth in the order of magnitude of 24.

* * * * *